Oct. 2, 1934.  A. ROSS  1,975,296
BALL BEARING PULLEY
Filed Aug. 6, 1929
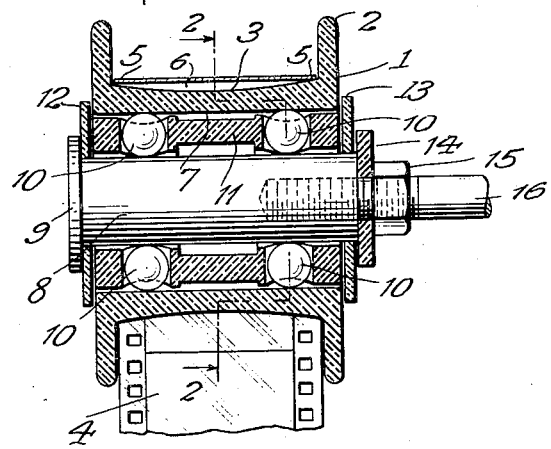
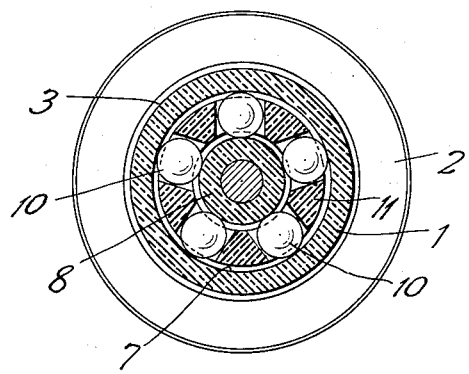
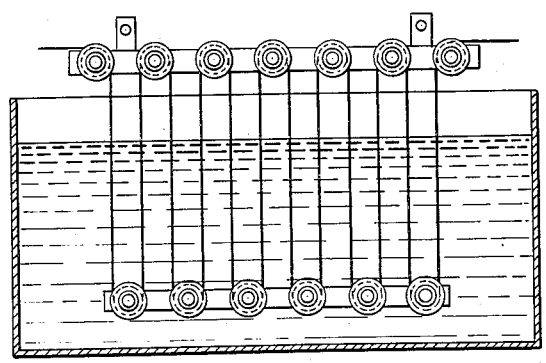
ARTHUR ROSS
INVENTOR
BY
ATTORNEY Patented Oct. 2, 1934

1,975,296

UNITED STATES PATENT OFFICE 1,975,296

BALL BEARING PULLEY

Arthur Ross, Lynbrook, N. Y., assignor, by mesne assignments, to United Research Corporation, Long Island City, N. Y.

Application August 6, 1929, Serial No. 383,958

2 Claims. (Cl. 308—190)

This invention relates to spools for use in film developing and washing machines and similar devices.

It is an object of my invention to provide an improved form of spool for carrying camera film or similar webs and operating submerged in a sensitive fluid such as film developing or fixing bath.

A further object is to provide a spool which is adapted to carry a strip of wet film without injury to the film.

A still further object is to produce a freely running spool bearing which will not be attacked by chemical solutions such as used in film treatment.

Another object is the provision of a spool for carrying a wet film or other web, which is so constructed as to provide a strong frictional grip between the periphery of the spool and the film.

In certain types of film developing machines which are adapted to operate on a long strip of film, it is a practice to provide a large number of spools or pulleys over which the film is threaded, passing successively from one spool to the next. Where the film is to be treated in a fluid bath, the spools are usually arranged in two groups on suitable racks, one above the surface of the bathing solution and the other group submerged therein. The rack within the solution may, in some cases, be left free to move up and down so as to allow for variations in the length of the film between the first and last spools of the series. Where apparatus of this nature is used, it is very important for several reasons that the spools be freely running. One of these reasons is that if much friction is encountered, the film may be injured due to the mechanical strain necessary to draw it through the machine. Another trouble is that wherein an appreciable amount of friction is present at each spool bearing, the entire lower rack may be tilted at an angle because of cumulative creeping of the film resulting from friction at the successive spool bearings. Several of the spools on the top rack are usually power driven to advance the film. It is necessary that these spools be so constructed as to exert on the film a relatively great driving force while at the same time not damaging the film should there be any slippage between the two.

In accordance with my invention, I have provided a form of spool having a ball bearing support, the entire assembled device being adapted to resist attack by the various sensitive chemical solutions used in film developing, printing and analogous arts. This spool is made of hard rubber, glass, bakelite or similar chemical resisting material and is supported on a center shaft of similar material by means of glass beads which serve as ball bearings. These beads are held in position by a particular form of retainer.

In order to insure support of the film on the spool without injury to the film, and to provide sufficient friction between the film and the spool to give adequate driving power, the surface of the spool with which the film contacts, is made slightly concave. This is the reverse of the usual accepted practice for the construction of pulleys for carrying a flat belt. Pulleys are ordinarily made with a crowned surface. I have found that this type of construction is not entirely suitable for use in film developing and washing machines, for the reason that where the power used is small there is a tendency for the film to slip with respect to the pulley. This is true whether the pulley is an idler or a driver. Where the pulley is merely an idler, the film has to overcome only the frictional resistance of the bearing, but this may be great especially where the bearing is immersed in developer or other fluid so that it cannot be lubricated. By constructing the spools with a slightly hollowed driving surface, the film is supported only at its edges where the sprocket holes are located, and where there is no emulsion.

The layer of fluid which necessarily must be present between the film and the spool, collects in the hollow portion between the film and the middle of the driving face of the spool. This permits a close contact of the edges of the film with the high portions of the driving surface, thus insuring greater driving friction.

I find that very good results may be obtained where standard width moving picture film is being used by making the center portion of the spool have a diameter about 1½ thousandths of an inch less than that of the edges thereof. With such a construction, the film is properly supported by the layer of fluid or moisture so that it lies substantially flat on the driving surface. Because of the hollowed surface of the spool greater pressure is necessarily applied between the edges of the film and the high portions of the driving surface thereby additionally insuring close contact and greater driving friction. If by chance slippage between the film and the driving surface occurs the edges of the film only will be subjected to abrasion as the center portion of the film is held separated from the driving surface by the body of solution present between the film and the spool in the hollowed portion.

The above mentioned and other objects and advantages and the manner of attaining them will be made clear in the following description taken in conjunction with the accompanying drawing.

Referring to the drawing, Fig. 1 is a view in vertical cross-section of a spool constructed in accordance with my invention.

Fig. 2 is a sectional view taken along line 2—2 of Fig. 1.

Fig. 3 is a view of a washing tank showing the spools in use.

Referring more particularly to the drawing, reference numeral 1 indicates a pulley having a pair of flanges 2 and a hollowed concave driving surface 3 over which is adapted to pass a moving picture film or similar web 4. As shown most clearly in Fig. 1, the film touches the driving surface only at the edges, indicated at 5, and is spaced from the center portion of the driving surface at 6. The space 6, when the film is either wet or immersed in a solution, is filled with liquid which serves as a sort of lubricant or spacing agent for protecting the film against abrasion which might result from contact with the driving surface.

The pulley 1 has a cylindrical opening 7 within which is centered a bearing pin 8 having a head 9. Positioned between the surface of the pin and the inside wall of the opening 7, is a series of glass balls 10 which are held in their proper spaced relationship by a retainer 11 which has a plurality of perforations within which the balls are located. For holding the retainer 11 in its proper position, a pair of cover plates or washers 12 and 13 are utilized at each end of the pin 8. These washers are made of hard rubber or Allegheny steel. For holding the entire bearing in assembled form, a washer 14 is placed at the end of the pin 8 beside the washer 13 and is held in place by a nut 15 on a threaded rod or stud 16 which is threaded into the end of the pin 8. The rod 16 also serves as a means for fastening the spool to a rack or other suitable support.

I find that a very efficient form of bearing may be constructed by using glass balls in conjunction with other parts made of hard rubber, however, it is possible the balls might be made of hard rubber or bakelite instead of glass, or that bakelite or glass may be used for the other parts of the spool.

I have described a particular embodiment of my invention for the purpose of illustration and it will be obvious to those skilled in the art that variations, modifications and adaptations may be made without a departure from the spirit of the invention as defined in the following claims.

What I claim is:

1. A developing guide roll for carrying film through a chemical solution and composed of material resistant to said chemical solution, said guide roll comprising a flanged pulley having a concave periphery and an axial opening therein, a bearing pin centered in said opening, a plurality of sets of roller bearings separated axially along said pin and positioned between the wall of said opening and said pin, a unitary retainer for said sets of rollers, said retainer being narrower than the space between the walls of said opening and said pin, means on said pin for keeping said roller retainer in position, and passageways at opposite sides of said retainer for permitting access of said solution to said rollers and to said roller retainer while immersed therein.

2. A developing guide roll for carrying film through a chemical solution and composed of material resistant to said chemical solution, said roll comprising a flanged pulley having a concave periphery and an axial opening therethrough, a pin centered in said opening, a plurality of sets of roller bearings separated axially along said pin and contacting with said pin and with the wall of said opening, a unitary retainer for said sets of roller bearings, stop means on said pin for limiting the axial displacement of said pulley on said pin and means permitting said solution to lubricate said roller bearings while said guide roll is immersed in said solution.

ARTHUR ROSS.